(12) United States Patent
Dunkley

(10) Patent No.: US 6,557,877 B2
(45) Date of Patent: May 6, 2003

(54) REGENERATIVE BRAKING AND DRIVING APPARATUS

(76) Inventor: Jason Dunkley, 12 Williams Point Road, Nestleton, Ontario (CA)

( * ) Notice: Subject to any disclaimer, the term of this patent is extended or adjusted under 35 U.S.C. 154(b) by 0 days.

(21) Appl. No.: 09/924,506

(22) Filed: Aug. 9, 2001

(65) Prior Publication Data

US 2002/0020984 A1 Feb. 21, 2002

(30) Foreign Application Priority Data

Aug. 9, 2000 (CA) .......................................... 2 315 499

(51) Int. Cl.$^7$ ................................................ B62M 1/10
(52) U.S. Cl. ...................................... 280/215; 280/260
(58) Field of Search ................................ 280/210, 212, 280/215, 214, 264, 259, 260; 180/165; 185/40 H

(56) References Cited

U.S. PATENT DOCUMENTS

| | | |
|---|---|---|
| 1,508,558 A | 9/1924 | Kollmann |
| 2,638,359 A | 5/1953 | Crumble |
| 2,908,356 A | 10/1959 | Daarud |
| 4,108,459 A | 8/1978 | Alvigini |
| 4,305,599 A | 12/1981 | Houston |
| 4,416,464 A | 11/1983 | Mattox |
| 4,744,577 A | 5/1988 | Brent et al. |
| 5,188,003 A | 2/1993 | Trammell, Jr. |
| 5,388,847 A | 2/1995 | Trammell, Jr. |
| 6,019,385 A | 2/2000 | Kelley et al. |
| 6,035,970 A | 3/2000 | Conte |
| 6,053,830 A * | 4/2000 | Glaeser ....................... 280/215 |

FOREIGN PATENT DOCUMENTS

| | | | | |
|---|---|---|---|---|
| DE | 841701 | * | 4/1952 | .................. 280/212 |
| WO | 8101822 | * | 7/1981 | .................. 280/215 |

* cited by examiner

Primary Examiner—Anne Marie Boehler
(74) Attorney, Agent, or Firm—Birch, Stewart, Kolasch & Birch, LLP

(57) ABSTRACT

A coil spring is mounted in the hub of a wheel of a vehicle. One end of the coil spring is connected to a ratchet and the ratchet is engaged by a pawl which is connected to the hub. A brake is also mounted in the hub. The drum of the brake is connected to the other end of the coil spring and the brake pad is connected to the axle of the wheel. When the brake is activated, the spring deforms and applies a braking force on the wheel. When the brake is de-activated, the wheel is driven forward by the spring as it unwinds.

23 Claims, 9 Drawing Sheets

REGENERATIVE BRAKING AND DRIVING APPARATUS

BACKGROUND OF THE INVENTION

This invention relates to regenerative braking and driving apparatus for vehicles and more particularly to a braking and driving apparatus which serves to brake a vehicle while simultaneously storing kinetic energy and which harnesses such energy to drive the vehicle forward when the brake is released.

It is known to store kinetic energy from a bicycle when it is coasting or travelling down an incline and to use that energy later when the bicycle is travelling uphill. There are many patents which describe mechanisms for storing such energy in a coil or spiral spring and for harnessing that energy to propel a bicycle forward. In some patents, the energy is generated at the chainwheel or the sprocket to which the pedals are attached. Examples of such patents are U.S. Pat. No. 4,305,599 to Houston; U.S. Pat. No. 6,053,830 to Glaeser; U.S. Pat. No. 2,908,356 to Daarud; and U.S. Pat. No. 2,638,359 to Crumble.

Known mechanisms, such as those enumerated above, have a number of disadvantages. For example, while the spring is being charged, the energy that would otherwise be used to propel the vehicle is used to charge the spring. In some cases the rider has no option about when charging occurs. Charging may, for example, occur at a time when the rider would prefer that all the energy he is expending be used to propel the bicycle forward such as when he is travelling up an incline or he is accelerating.

In other cases, a lever is provided for selecting when energy is to be stored in the coil spring. In those cases, the rider must consciously manipulate the lever. If the rider is travelling in a hilly or alpine terrain when he has to make many turns and to apply the brakes constantly in a short space of time, he may not have sufficient time to use the lever to make effective use of the energy storage capabilities of the mechanism.

In U.S. Pat. No. 6,035,970 to Conte the energy is captured at the wheel of the bicycle. In that patent, a roller at the rim of a wheel charges a coil spring which is mounted to a cross bar of the bicycle. The roller is only engaged when the brake is applied. A lever on the handlebar allows the rider to use the energy to propel the vehicle when he chooses to do so.

The apparatus described in Conte does not share many of the disadvantages of the other patents enumerated above but it has other disadvantages. First, the roller may not work very well when the bicycle is being ridden in rain and the rim of the wheel is slick. Secondly, the roller may become jammed by a stick, pebble or other obstruction. Thirdly, the roller activates a cable which is mounted at a distance from the roller and energy is lost between the roller and the coil. Fourthly the device is activated by a lever at the handlebar and is inconvenient to use in hilly or alpine terrain for the reasons mentioned above.

SUMMARY OF THE INVENTION

The braking and driving apparatus of the subject invention has none of the disadvantages of the known apparatuses described above. The apparatus includes a torsional spring which rotates with the wheel until the rate of rotation of one end is decreased relative to the other end. Rotation of the end can be decreased by various means such as by a brake, a clutch, a ratchet, balls and detents and a friction plate. Each of these means causes the spring to deform and in that sense is a "deforming means". As the rate of rotation of the end decreases, the spring deforms elastically and the rate of the other end likewise decreases.

In the detailed description of the invention, the deforming means is a brake but it is to be understood that other mechanisms are also suitable As long as the mechanism is capable of stopping one end of the coil spring from rotating relative to the other it is suitable.

If a brake is used to decrease the rate of rotation of one end of the spring, that end is preferably affixed to a concentric brake drum mounted about an axle of the vehicle. When the brake is applied, the drum ceases to rotate with the wheel of the vehicle and remains stationary relative to the vehicle. At this time the spring deforms elastically and causes the other end of the spring to activate a ratchet apparatus. That apparatus ensures that the wheel does not rotate faster than the end. The spring thus causes the wheel to decelerate. In other words, the spring acts as a brake for the wheel.

When the braking force is relieved, rotation of the drum will be opposed by one ratchet between a slip sleeve and the brake drum. Torque from the spring will cause the slip sleeve to advance by rotating through a small angle. Such rotation will cause a second ratchet to disengage by depression of its engaged pawls. The tendency of the spring to unwind will be opposed by a third ratchet between a stationary shaft and a retainer for the spring. As the spring unwinds, the vehicle is driven forward until the kinetic energy stored in the spring is dissipated at which time the slip sleeve will return by rotating backward through the small angle and permit the second ratchet to re-engage.

While the braking and driving apparatus of the invention has application in many different vehicles such as bicycles, golf carts, solar vehicles, mopeds and go-carts, the apparatus that will be described in detail below is one used to brake a bicycle. The means for causing the rate of rotation of one end of the coil spring to decrease relative to the other is a conventional brake having a pad and a drum but, as indicated above, other means may be used to produce the same result.

Currently, a typical bicycle is braked manually by means of frictional forces acting on a brake pad and rim, drum or disc interface. The kinetic energy of the rider of the bicycle and the bicycle at a given velocity is dissipated almost entirely by this frictional force. The energy is lost primarily to heat, wear on the braking surfaces and vibration.

For an application such as alpine biking, braking can occur dozens of times a minute. Energy is lost each time the brake is applied. If the kinetic energy can be stored, even in part, while the bicycle decelerates and the energy used to accelerate the bicycle after braking, a significant increase in overall efficiency is realized.

By employing a triple ratchet torsional spring apparatus mounted in the hub of the bicycle, the spring can be charged and discharged by the braking action of the rider. One end of the spring is connected to a braking apparatus and the other end is connected to the hub thus allowing the spring to apply a torsional moment, opposing the direction of travel of the bicycle, thereby supplying the braking force. A ratchet is interposed at each connection to restrict the motion of the spring and hub to one direction only. When the braking force is released, the charged spring then drives the bicycle in the forward direction until it is fully discharged. This is not intended as an alternative to pedalling but rather to be used in conjunction with pedalling to augment the power source.

The braking apparatus is useful in relatively small vehicles such as bicycles, golf carts, solar vehicles, mopeds and go-carts. Briefly, the regenerative braking and driving apparatus of the invention comprises resilient means operatively connected to a wheel; deforming means which when activated causes the resilient means to resiliently deform with resulting braking of the wheel and which, when de-activated, allows the resilient means to return to an undeformed state. The resilient means, as it returns drives the wheel forward.

DESCRIPTION OF THE DRAWINGS

The braking apparatus of the invention is described with reference to the accompanying drawings in which:

In FIG. 8, the clutch is rotating counter-clockwise and in FIG. 9, the clutch is rotating in the opposite direction;

Like parts refer to like parts throughout the description of the drawings.

DESCRIPTION OF THE PREFERRED EMBODIMENT

Figure 1:
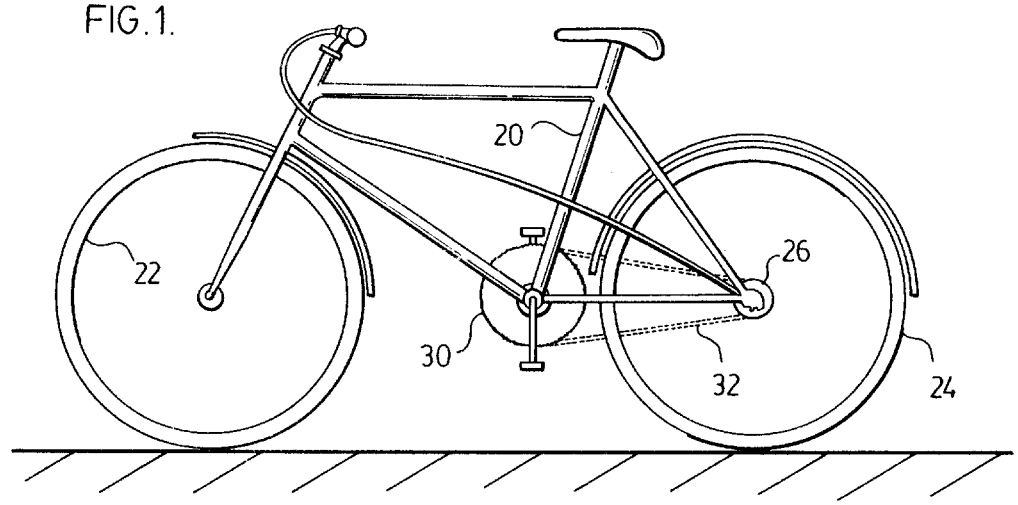
FIG. 1 is an elevation of a bicycle.
Figure 2:
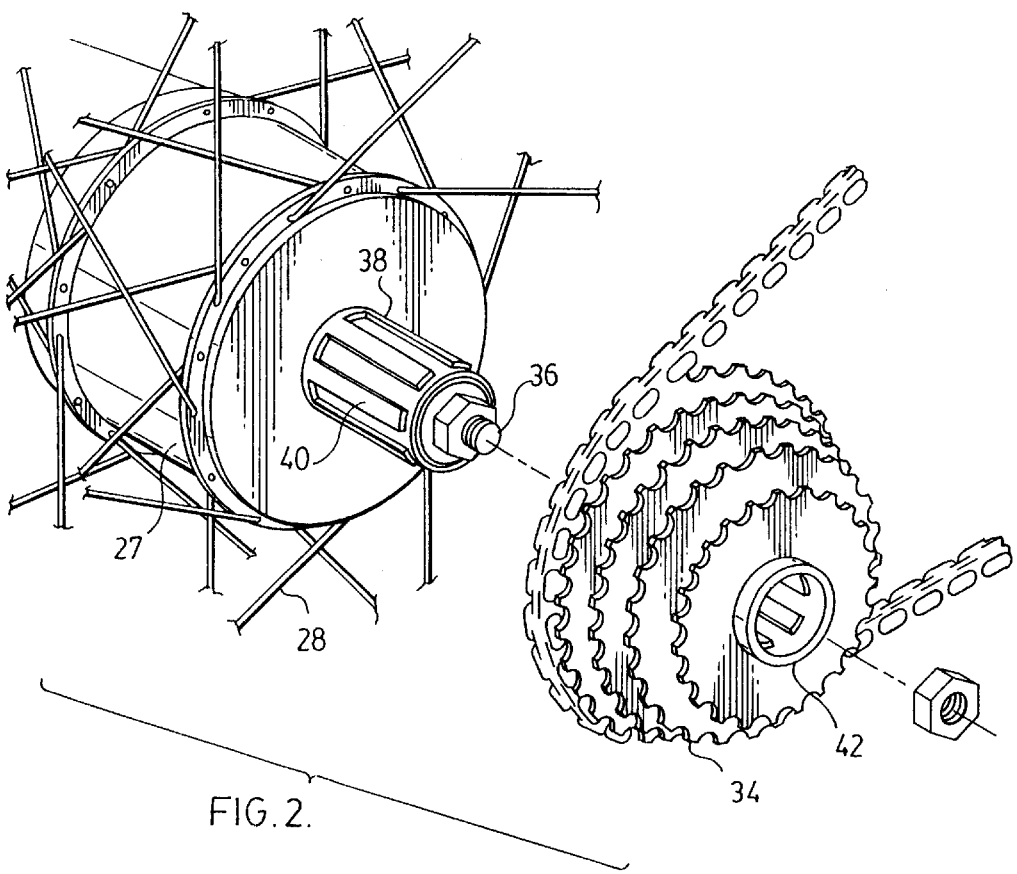
FIG. 2 is a perspective view of a hub and a cluster of gears separated from the hub.

With reference to FIGS. 1 and 2, the illustrated bicycle has a frame 20 and forward and rear wheels 22, 24. The rear wheel has a hub 26 having an outer casing or housing 27 from which a number of spokes 28 radiate. A driving sprocket or chainwheel 30 is connected by chain 32 to a cluster of driven sprockets 34 (generally referred to as a "cassette").

The sprockets are of the derailleur type of gearing for a bicycle. The apparatus for lifting and transferring the chain from one sprocket to another to provide a change of gear and the chain tensioning device to take up the slack in the chain when making the change of gear are well known and are not illustrated or described.

An axle 36 is disposed centrally of the hub and its ends are bolted to the frame 20 of the bicycle. The axle is thus stationary with respect to the frame. A freewheel or free hub 38 is mounted concentrically about the axle and a number of splines 40 extend outwardly from the free hub and into recesses in the central hollow cylinder 42 of the cassette. As is conventional, the freewheel is free to rotate in one direction about the axle but not in the other.

Figure 3:
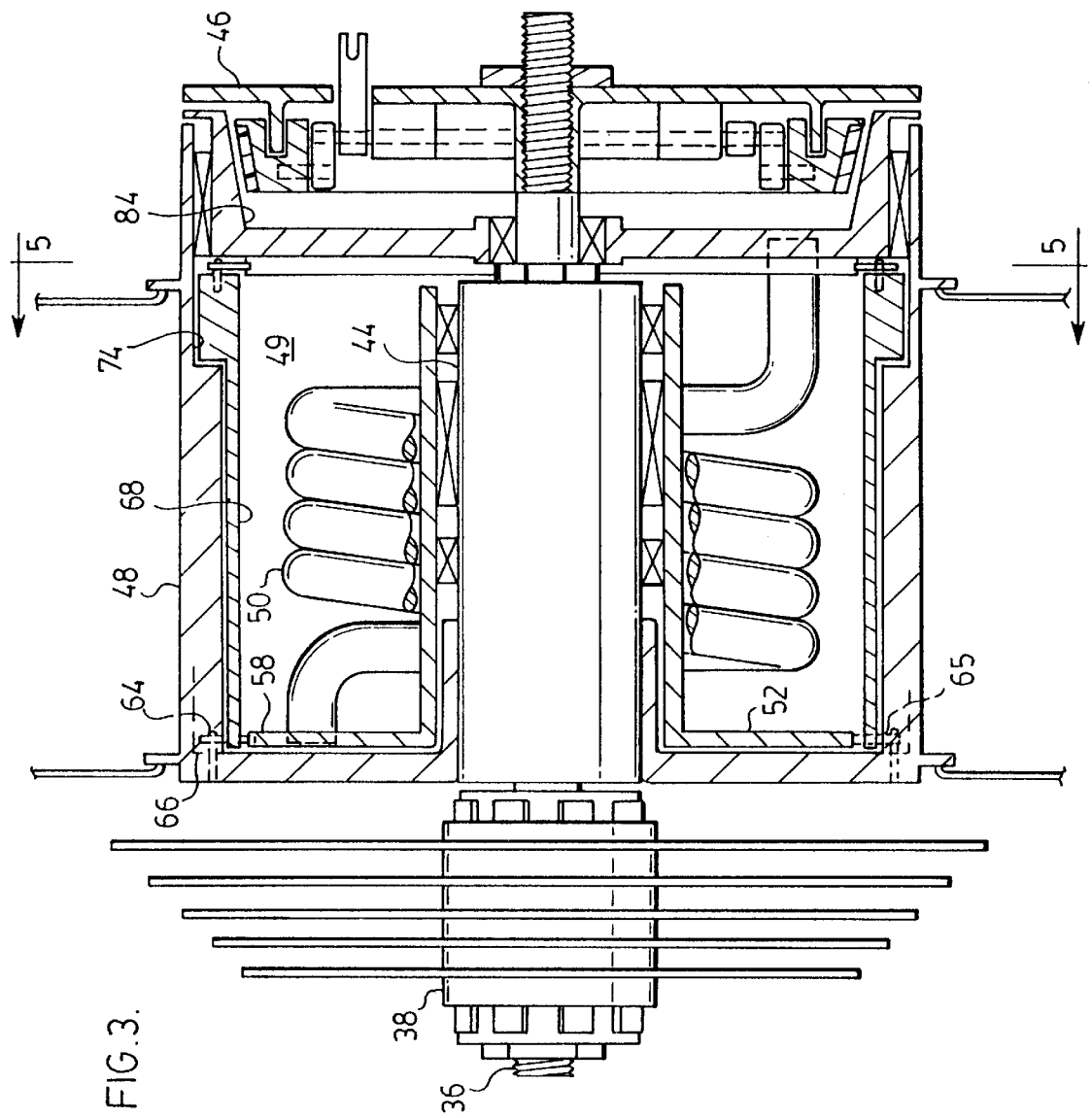
FIG. 3 is an elevation, partly cut away, of the hub and the cluster of gears connected to the hub.
Figure 4:
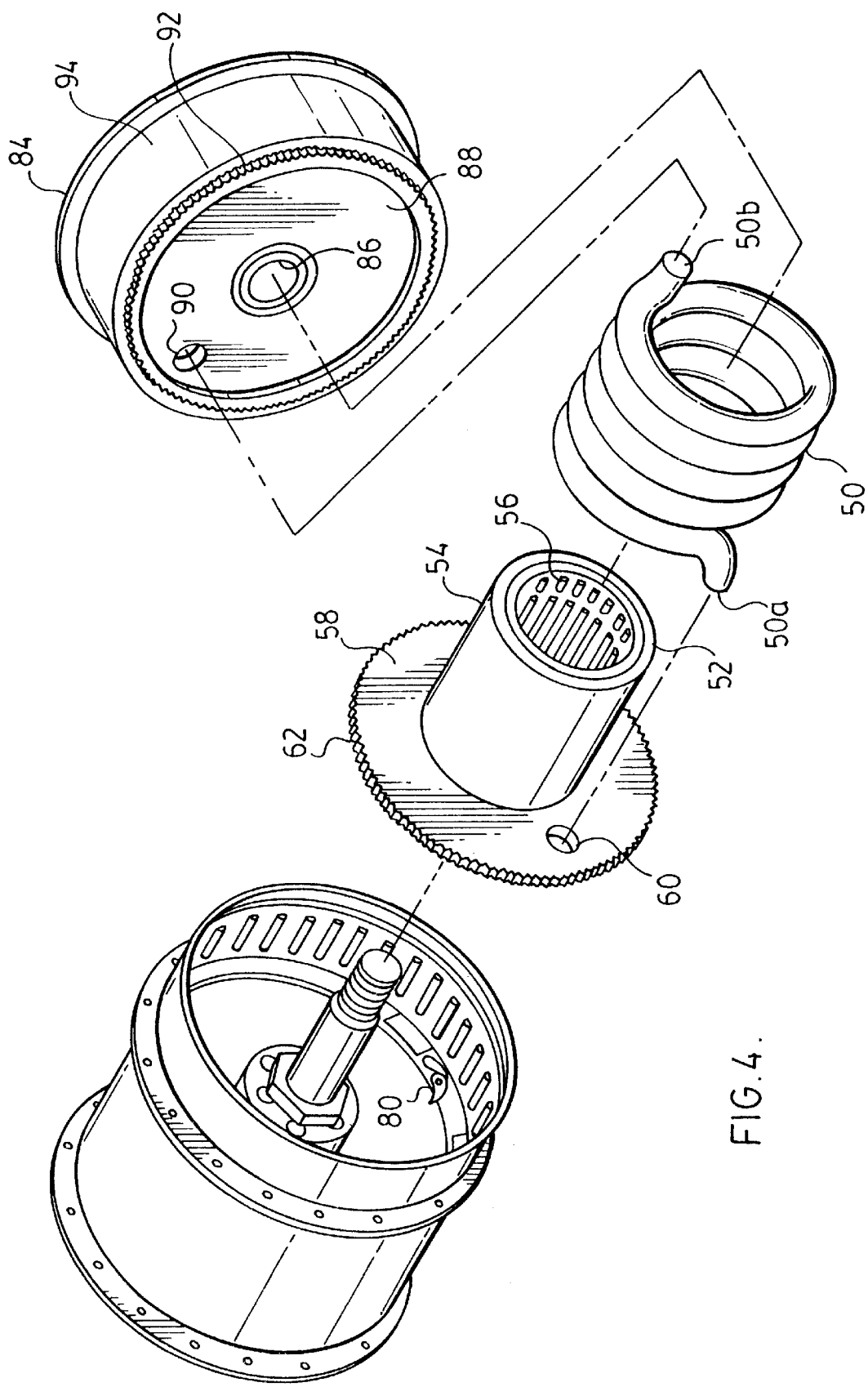
FIG. 4 is an exploded perspective view of a portion of the hub.

With reference to FIGS. 3 and 4, the axle passes into the housing of the hub and is splined to a cylinder 44. The housing is defined, at one end, by end cap 46 which is attached by threads to the axle. A cylindrical outer wall 48 defines the outer limit of the housing.

Between the cylinder and outer wall of the hub is an annular cavity 49 for receipt of a torsional main coil spring 50 and a spring retainer 52. The main spring has an end 50a which is connected to the spring retainer and the retainer, in turn, is connected to the hub and the wheel by means of a ratchet described below. End 50a is referred to below as the "driven end" of the spring. The other end 50b of the main spring is connected to an apparatus for causing the spring to deform. The apparatus illustrated in the drawings is a brake and the end of the coil spring to which it is connected is referred to as the "driving end".

The spring retainer has a central hollow cylinder 54 which is disposed concentrically about cylinder 44 and the main spring in turn is disposed concentrically about hollow cylinder 54.

Figure 8:
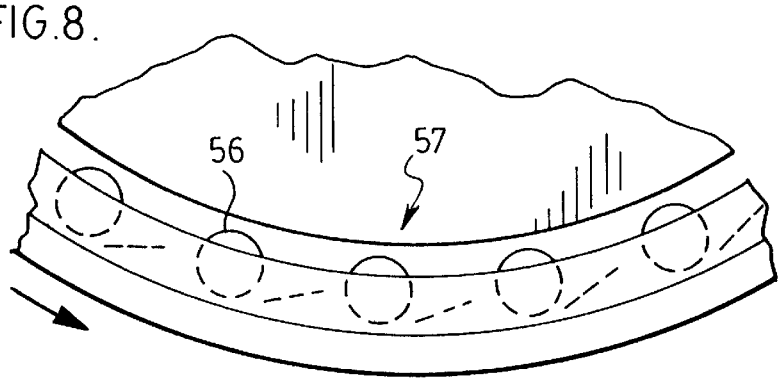
FIGS. 8 and 9 are fragmentary elevations of the roller clutch mounted within the hub.
Figure 9:
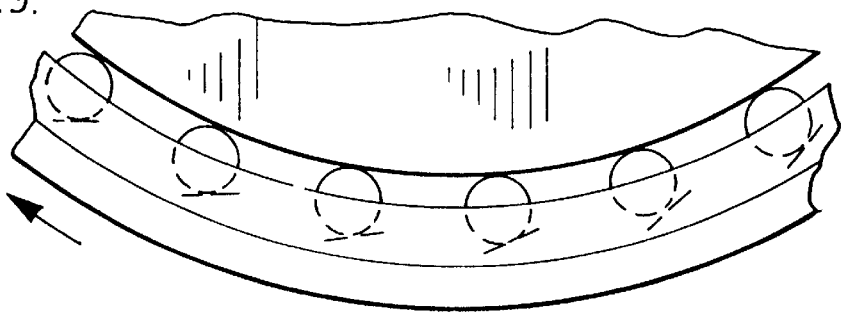

With reference to FIGS. 4, 8 and 9 a number of rollers 56 are spaced along the inner wall of the hollow cylinder and the rollers are received in tapered-slot raceways which are part of the roller clutch and are pressed into spring retainer 52. The outer wall acts as the inner raceway of a roller clutch and the hollow cylinder acts as a freewheel which is free to rotate about the cylinder and the axle in a counter-clockwise direction as illustrated in FIG. 8 but not the other direction as illustrated in FIG. 9.

Rollers 56 act as a so-called "roller clutch" in the context of this invention and is identified generally by the number 57 in FIGS. 8 and 9.

Figure 5:
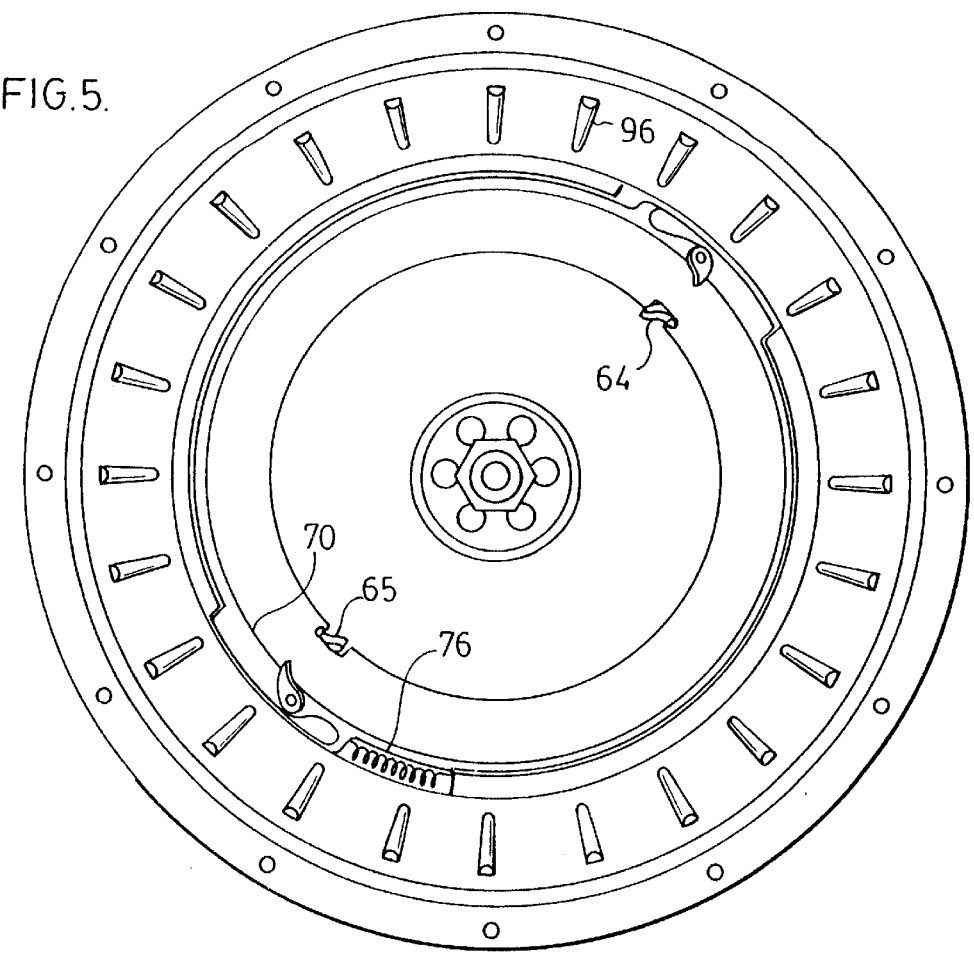
FIG. 5 is an end view of the hub on line 5—5 of FIG. 3.
Figure 10:
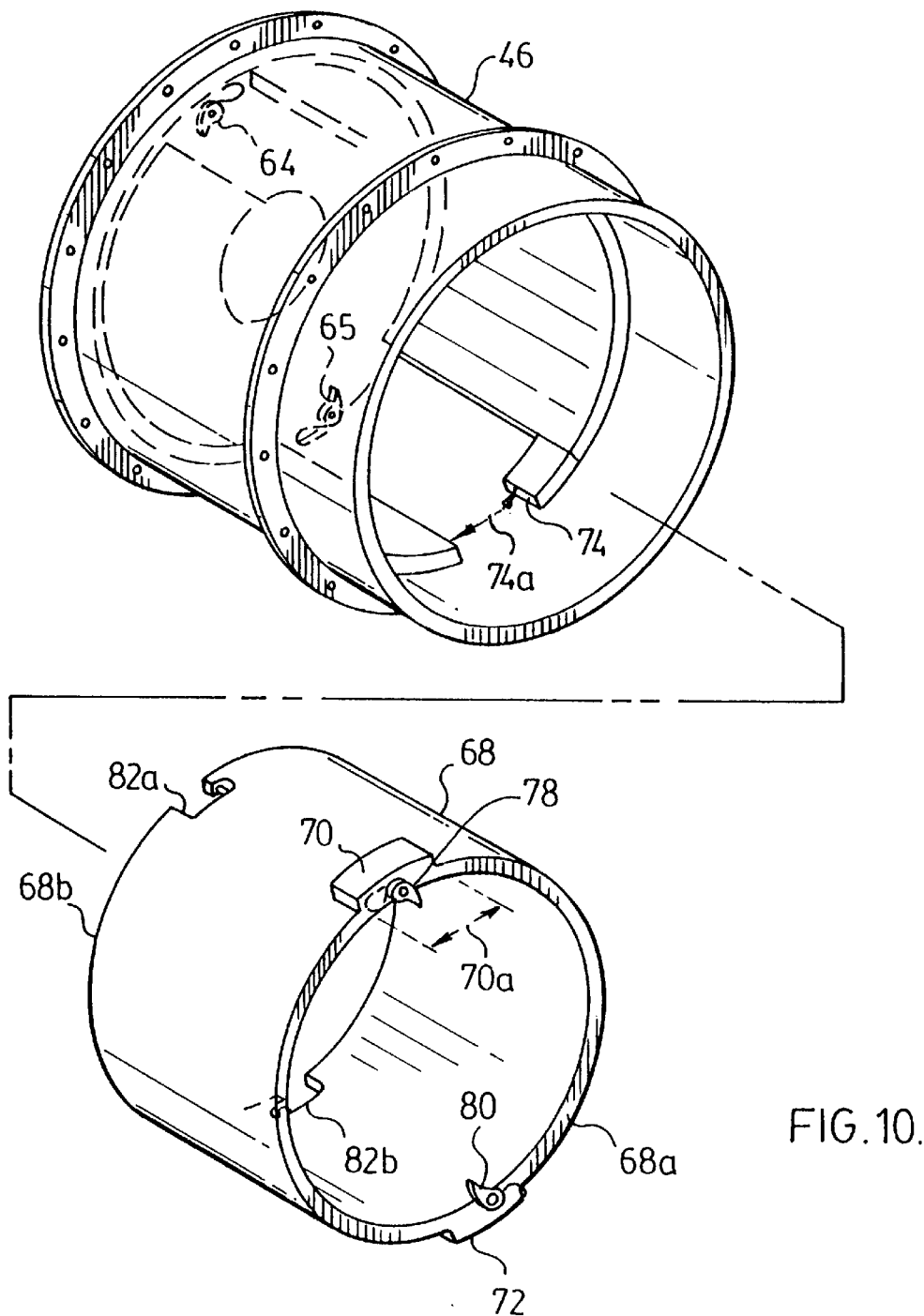
FIG. 10 is a perspective view of the outer wall of the hub and the slip-sleeve.
Figure 11:
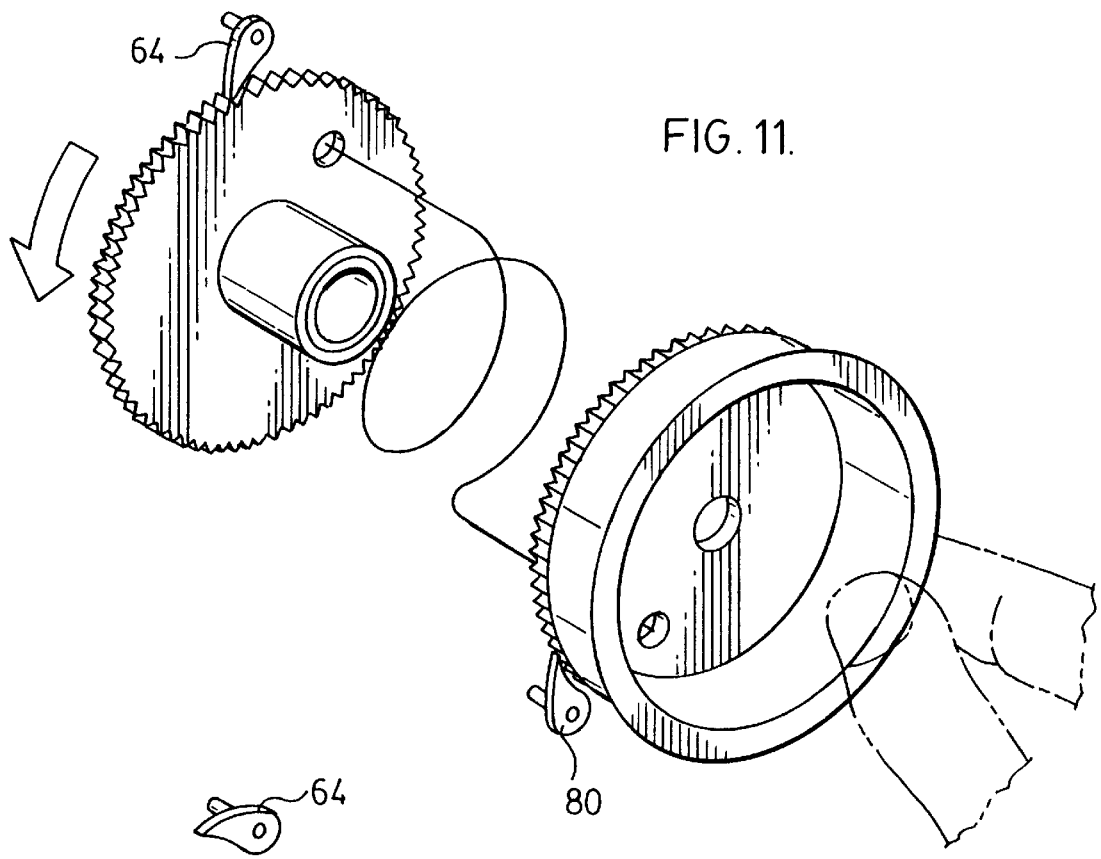
FIGS. 11 and 12 are perspective views of two ratchets mounted within the hub.
Figure 12:
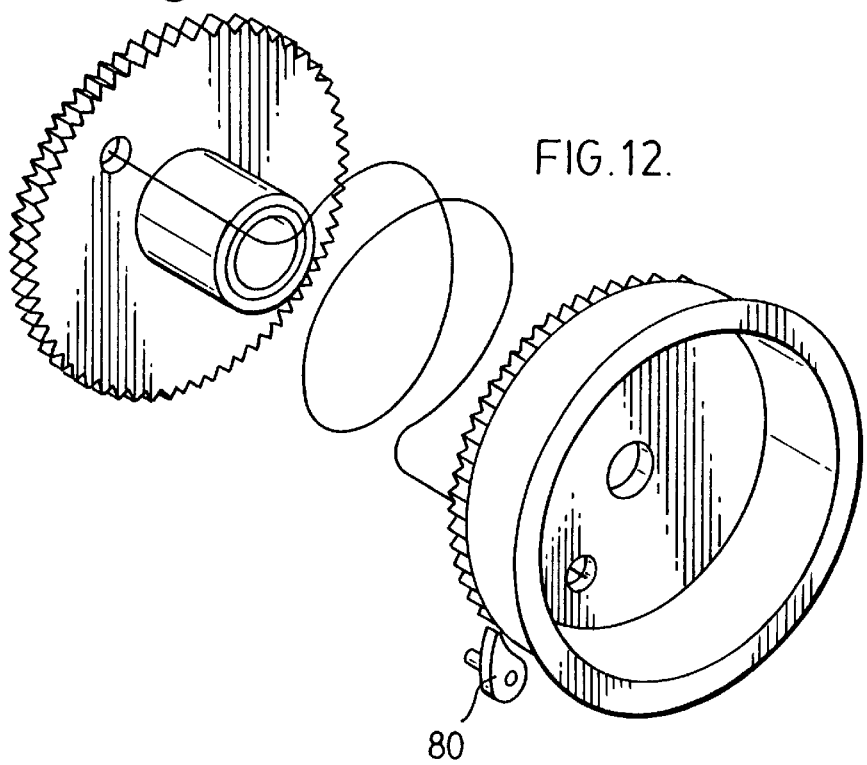

The spring retainer has an annular base 58 which extends radially outward from one end of the hollow cylinder. An aperture 60 is formed in the base for receipt of the driven end 50a of the main spring. A ratchet 62 is formed on the outer edge of the base. As illustrated in FIGS. 3,5 and 10, pawls 64, 65 engage the teeth of the ratchet to ensure that the motion of the base is only in the counter-clockwise direction with respect to the hub. The pawl is disposed in a recess 66 in the outer wall of the housing as illustrated in FIG. 3 and the pawl is pivotally connected to that wall.

Ratchet 62 will be referred to henceforth as the "first ratcheting means" to distinguish it from two other ratcheting means which are described below. The second so-called ratcheting means is roller clutch 57 between the hollow cylinder of spring retainer 52 and cylinder 44.

With reference to FIGS. 3 and 10, a cylindrical slip-sleeve 68 is disposed within the hub and adjacent to the inside surface of the outer wall 48 of the housing. The sleeve has a pair of diametrically opposite rectangular tabs 70, 72 on its outer wall adjacent to one end wall 68a and those tabs are received in diametrically opposite slots (one illustrated and marked 74) formed in the outer wall. The length 70a of tab 70, measured on the arc of the outer wall of the slip-sleeve, is less than the width 74a of the slot so that the sleeve may pivot or "slip" between the two edges of the slot. The extent of slippage is however very limited.

With reference to FIG. 5, resilient means in the form of a small coil return spring 76 is disposed in the space between one side of tab 70 and the adjacent side edge of the slot in order to bias the slip-sleeve in a clockwise direction.

Figure 7:
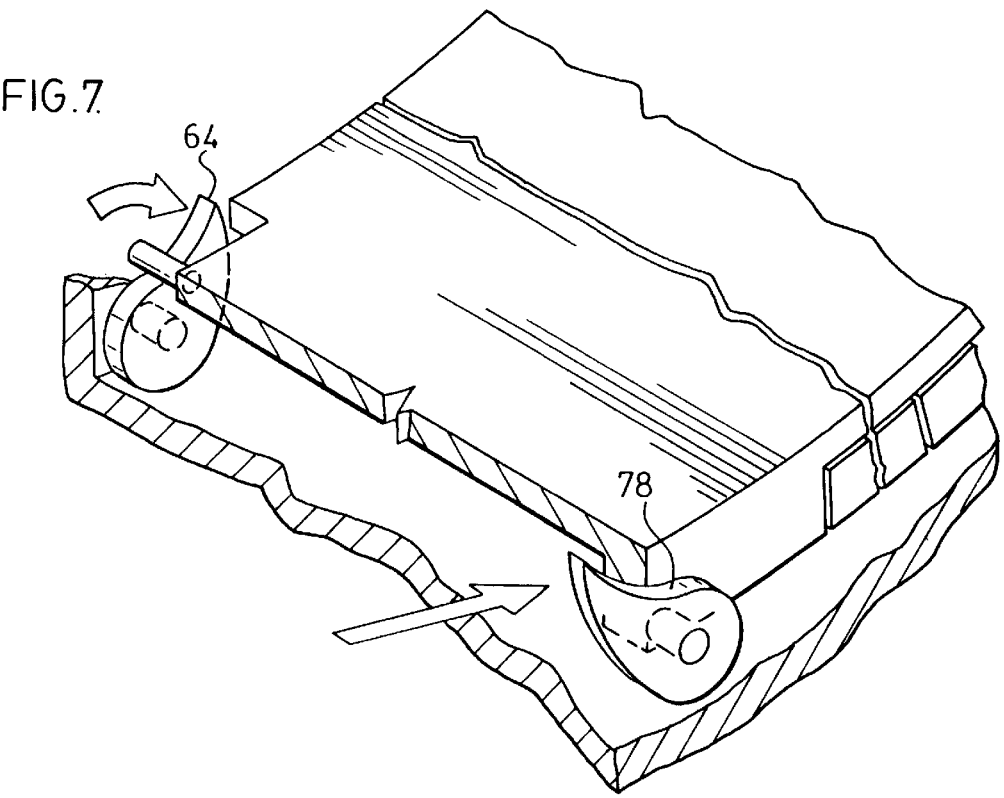
FIG. 7 is a fragmentary perspective view of pawls mounted to a slip-sleeve and pawls mounted within the hub.

With reference to FIGS. 7 and 10, two pawls 78, 80 are pivotally attached at diametrically opposite sides of end wall 68a of the slip-sleeve. In the other end wall 68b of the slip-sleeve, two apertures 82a,b are formed so that the operation of pawls 64, 65 is not inhibited by the slip-sleeve.

With reference to FIGS. 3 and 4, a brake drum 84 has a central opening 86 defined by a ball bearing for receipt of the axle. The brake drum is free to rotate around the axle. The drum has an end wall 88 in which an aperture 90 is formed for receipt of the driving end 50b of the main spring. A ratchet 92 referred to herein as the "third ratcheting means" is formed on the end wall and pawls 78, 80 formed on the slip-sleeve engage that ratchet to ensure that the brake drum does not rotate faster than the hub. The ratcheting means also ensures that the drum can rotate only in a clockwise direction relative to the slip-sleeve as depicted in FIG. 4.

Figure 6:
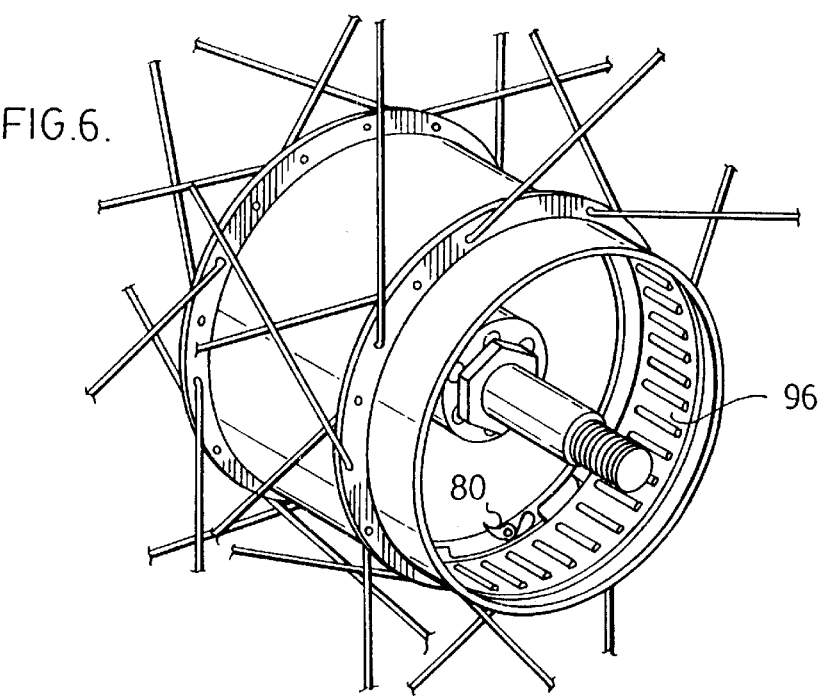
FIG. 6 is a perspective view of the hub.

With reference to FIGS. 4–6, the outer wall 94 of the brake drum is adjacent to the inside surface of the outer wall of the hub housing and roller bearings 96 are formed in that area so that the brake drum is free to rotate within the hub.

Figure 13:
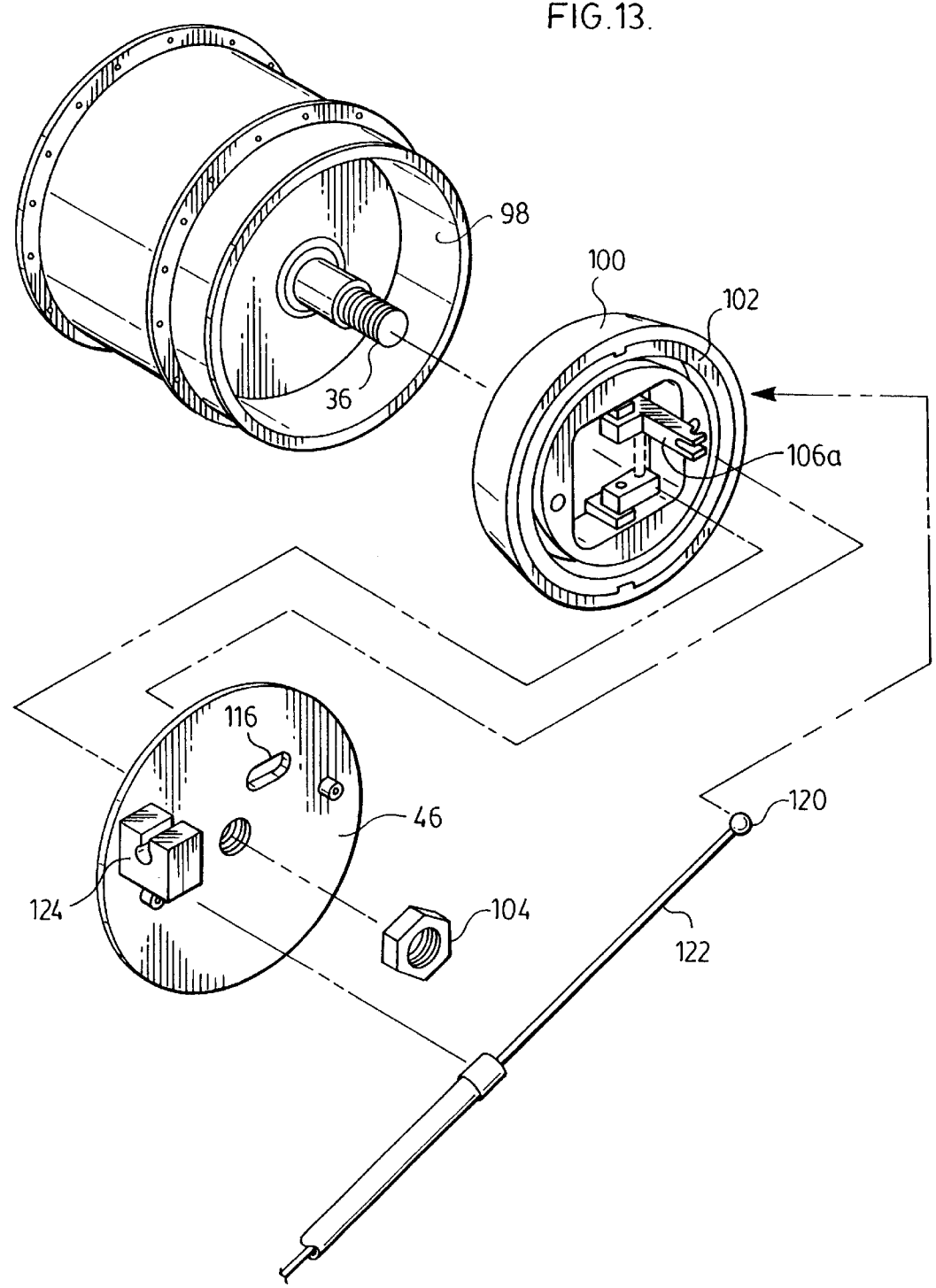
FIG. 13 is an exploded perspective view of the components of the brake.

With reference to FIG. 13, on the opposite side of the brake drum, an annular braking surface 98 is formed. Against that surface is seated an annular braking pad 100 which is formed on the outer wall of a ring-shaped insert 102. The insert is held in place by end cap 46 which defines the side limit of the hub. The end cap, in turn, is held in place by a nut 104 which is screwed to the threaded end of axle 36.

Figure 14:
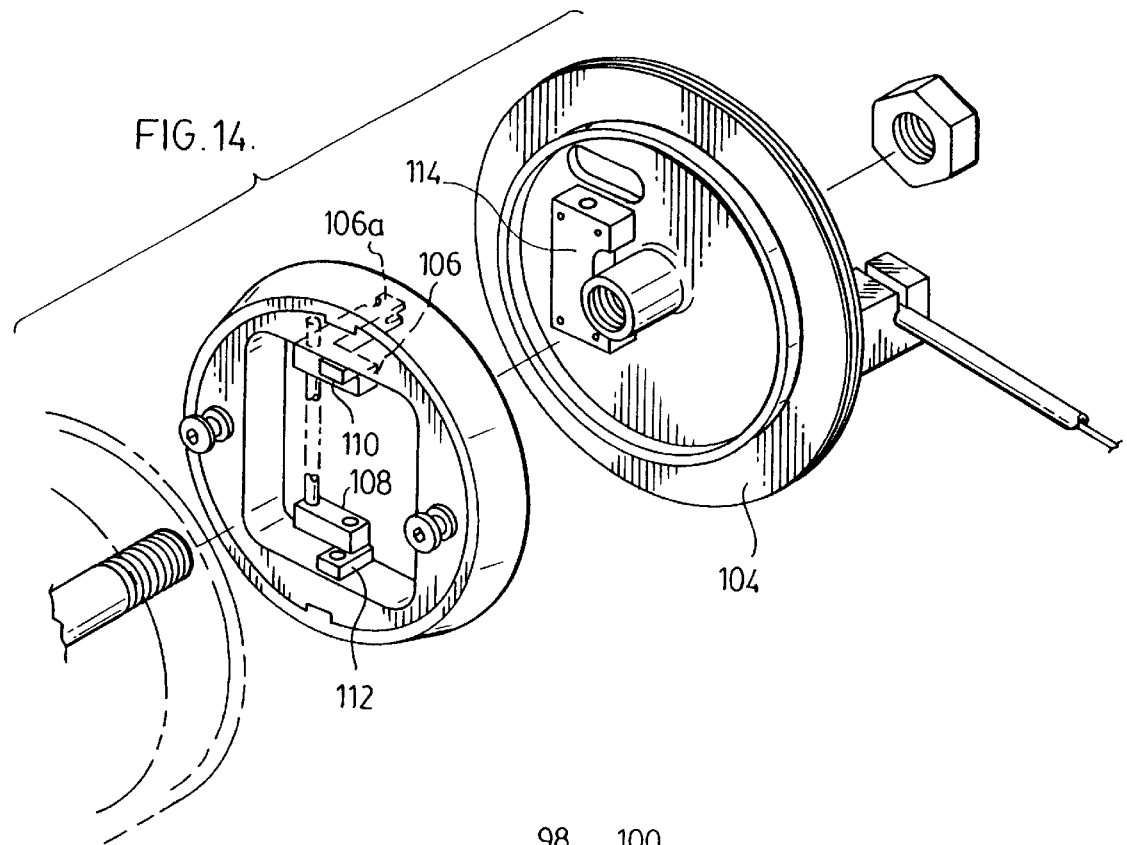
FIG. 14 is an exploded perspective view of the components of the brake from the side opposite that shown in FIG. 13.
Figure 15:
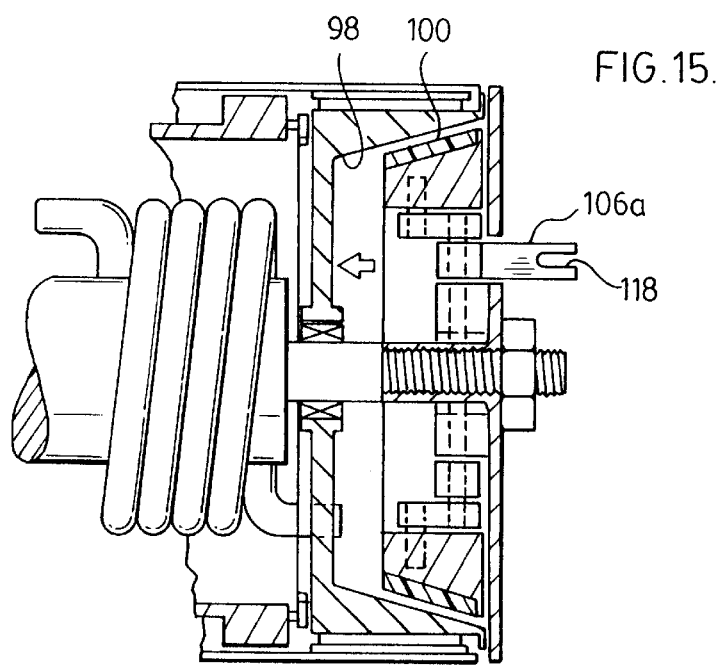
FIG. 15 is an elevation, partly in section, of the components of the brake and the main spring.

With reference to FIGS. 13–15, a pair of links 106, 108 is pivotally connected to a second pair of links 110, 112. The latter pair is pivotally connected to the wall of the insert which defines its hollow centre. Those links are also pivotally connected to a boss 114 which is bolted to the inside wall of the end cap. Link 106 has an extension 106a which projects through a slot 116 formed in the end cap. A recess 118 is formed in the end of the extension for receipt of a ball 120 fastened to the end of a conventional braking cable 122. The sheath of the cable is fastened in a mount 124 attached to the outer wall of the end cap. The braking cable serves as the control means for the brake.

The brake operates as follows: the brake is activated when the rider of the bicycle squeezes the brake handles at the handle bars. When he does so he activates the control means for the brake by causing the ball of the braking cable to retract thereby pulling extension 106a to the left in FIG. 13. As the extension moves, the links pivot thereby urging the insert to move in the direction of the arrow in FIG. 15. Such movement causes the brake pad 100 to move into contact with the braking surface 98 with resulting decrease in the rate of rotation of the brake drum and charging of the main spring 50.

Operation of the Ratcheting Means

The first ratcheting means (62). This ratcheting means prevents the driven end 50a of the main spring from rotating backward (clockwise) relative to the hub, as depicted in FIG. 4.

The second ratcheting means or roller clutch (57). This ratcheting means prevents the driven end 50a of the main spring from rotating backward (clockwise) relative to the axle. It serves to anchor that end while the main spring uncoils in the forward (counter-clockwise) direction as depicted in FIG. 4.

The third ratcheting means (92). When the brake is released, the driving end 50b of the main spring is free and will attempt to uncoil and cause the brake drum to rotate faster than the hub through a few degrees until tabs 70, 72 contact the edges of slots 74. The third ratcheting means resists such rapid uncoiling and prevents the brake drum from rotating faster than the hub after the tabs contact the slot walls.

Operation of the Braking Apparatus

The motion of the components is defined with respect to the frame of the bicycle as the ground reference or stationary reference. Components defined as stationary are therefore stationary with respect to the frame and not the ground. Components defined as rotating are rotating with respect to the frame. Both stationary and rotational references experience translational motion with respect to the ground. This net motion is not to be considered in this description. End 50a of the main spring implies the driven side or right hand to a rider as depicted in FIG. 4. End 50b or the left hand side implies the driving or other end.

There are essentially six discrete modes in which the hub can exist under regular operation, they being: coasting, charging, transition from charging, transition to discharging and transition to coasting. For the purposes of defining the apparatus other transient or variations are not described herein.

Mode 1—Coasting

This occurs when the rider is coasting or pedalling but not braking. The main spring is fully discharged, rotating freely and there is motion in the forward direction of the rider and bicycle with respect to ground. This mode will include the majority of flat riding and acceleration. With reference to FIGS. 3,4 and 13, the components function as follows:

Stationary: axle 36, brake pad 100, and the end cap 46

Rotating (at the speed of the wheel) brake drum 84, slip sleeve 68, the housing of the hub, spring retainer 52, main spring 50

Engaged: first ratcheting means 62

Disengaged: second and third ratcheting means 59 and 92.

Mode 2—Charging

When the brake is applied by the rider of the bicycle the relative rotation of the brake drum 84 ceases due to frictional forces at the brake pad and drum interface. Since the main spring 50 is rigidly attached to the brake drum at one end it will experience torsion between the now stationary brake drum and the rotating spring retainer. Effectively, one end of the main spring will be rotating and the other stationary. This causes torsion in the main spring and energy to be stored. This will continue as long as there is rotation and the brake is still on.

The components function as follows:

Stationary: axle 36, brake pad 100, end cap 46, brake drum 84, driving end 50b of the main spring Rotating; (at the speed of the wheel) slip sleeve 68, the housing of the hub, spring retainer 52, driven end 50a of the main spring Engaged: first ratcheting means 62

Disengaged: second and third ratcheting means 59 and 92

Mode 3—Transition from Charging

This mode is fundamental to the operation of the hub as a whole but only lasts for a fraction of a second. It is triggered by the release of the brake which permits forward rotation of end 50b of the main spring. This rotation is driven by the torque of the main spring as it unwinds. For an instant, the brake drum and end 50b of the main spring actually rotate faster in the forward direction than the housing of the hub or wheel itself. Almost immediately the third ratcheting means 92 engages thus joining the brake drum 84 to slip sleeve 68. This causes a rotation of the slip sleeve in the forward direction through some small angle (approximately 5 degrees). Rotation of the sleeve is resisted by return spring 76 and limited by a tab and recess between the slip sleeve 68 and the housing of the hub. As illustrated in FIG. 5, return spring 76 is located in a recess in the inside of the hub body and is retained therein by the slip sleeve.

The components function as follows:

Stationary: axle 36, brake pad 100, end cap 46

Rotating; (faster than the hub body) slip sleeve 68, driving end 50b of the main spring, brake drum 84

Engaged: first and third ratcheting means 62 and 92

Disengaged: second ratcheting means 59

Mode 4—Transition to Discharging

The transition to discharging overlaps somewhat with the transition from charging mode. While the slip sleeve rotates as explained in the previous section, slots machined in the right hand side of the slip sleeve as depicted in FIG. 10 slide over the sloped side of the pawls of first ratcheting means 62. The pawls of that ratcheting means are depressed and disengage with the mating external ratcheting means mounted on the spring retainer 52. At the instant when the first ratcheting means is disengaged, the driving end 50b of the main spring will tend to uncoil in the reverse direction due to the elastic deformation which occurs during the charging mode. This entire mode is a transient state and only serves to direct the drive in the correct orientation and to avoid the possibility of all three ratcheting means being engaged simultaneously.

The components function as follows:

Stationary: axle 36, brake pad 100, end cap 46

Rotating; (instantaneously rotating backward with respect to the hub body) driven end 50a of the main spring, spring retainer 52

Engaged: second and third ratcheting means 59 and 92

Disengaged: first ratcheting means 62

Mode 5—Discharging

An instant after the reverse rotation begins, the second ratcheting means will engage and resist this motion. By making the engagement of the second ratcheting means dependent on the disengagement of the first ratcheting means, the two ratcheting means will not engage simultaneously. The ratcheting means will accordingly not lock the wheel. At the point when the driving side of the main spring is rigidly attached to axle 36 (through the spring retainer and the second ratcheting means) and the driven side is attached to the hub housing (through the slip sleeve and third ratcheting means) uncoiling of the main spring begins. The charged main spring provides a torque to the hub body in the forward direction anchored to the axle. This forward torque will assist in the acceleration of the bicycle. The main spring will uncoil, fully discharging its stored energy, in the form of kinetic energy, to the bicycle.

The components function as follows:

Stationary: axle 36, brake pad 100, end cap 46, driven end 50a of the main spring, spring retainer 52

Rotating; (at the speed of the wheel) hub housing, slip sleeve 68, driving end 50b of main spring, brake drum 84

Engaged: second and third ratcheting means 59, 92

Disengaged: first ratcheting means 62

Mode 6—Transition to Coasting

This mode is triggered by the dissipation of energy in the main spring. When the energy in the main spring is almost entirely dissipated the return spring 76 will initiate the reverse rotation of the slip sleeve by the tab/recess combination between the slip sleeve and the housing of the hub. This rotation will occur when the torque of the main spring is less than the compression force of the compressed return spring at a distance equal to the radius of the slip sleeve. This reverse rotation of the slip sleeve permits the transition to coasting by exposing the pawls of the first ratcheting means. When that ratcheting means engages, because of direction, the second ratcheting means will automatically disengage which completes the mode transition to coasting and the cycle begins anew.

The components function as follows:

Stationary: axle 36, brake pad 100, end cap 46, driving end 50b of the main spring, spring retainer 52

Rotating; (backward with respect to the hub body) slip sleeve 68

Engaged: second and third ratcheting means 59 and 92

Disengaged: first ratcheting means 62.

It will be understood of course that modifications can be made in the braking and driving apparatus of the invention without departing from the scope of the invention as described and claimed herein.

I claim:

1. A regenerative braking and driving apparatus for a vehicle equipped with a wheel having a hub and an axle about which said hub rotates, said apparatus comprising:

first resilient means operatively connected to said wheel and mounted within said hub comprising a spring mounted to rotate about said axle, said spring having a driven end and a driving end;

deforming means which when activated causes said first resilient means to resiliently deform with resulting braking of said wheel and which, when de-activated, allows said first resilient means to return to an undeformed state, said first resilient means, when so returning, driving said wheel forward, said deforming means being mounted to rotate about said axle;

first ratcheting means operatively interconnecting said driven end of said spring and said wheel and operable to ensure that said driven end of said spring rotates in the same direction as said wheel;

second ratcheting means operatively interconnecting said driven end of said spring and said axle and operable to ensure that said driven end of said spring is immovable relative to said axle as said spring returns to an undeformed state;

third ratcheting means operatively interconnecting said driving end of said spring and said deforming means and operable to ensure that said deforming means rotates no faster than said wheel as said spring returns to an undeformed state;

a sleeve mounted to rotate about said axle, said sleeve adapted to rotate between operative and inoperative positions;

second resilient means for urging said sleeve to said inoperative position, said sleeve being operatively connected to said third ratcheting means and being caused by said deforming means, upon rotation in one direction, to rotate to said operative position, said sleeve further being connected to said first ratcheting means and causing said first ratcheting means to disengage as said sleeve rotates to said operative position, said second ratcheting means engaging upon disengagement of said first ratcheting means.

2. The apparatus as claimed in claim 1 further including means for causing said second ratcheting means to be engaged when said first ratcheting means is disengaged.

3. The apparatus as claimed in claim 1 further including means for causing disengagement of said first ratcheting means and engagement of said second ratcheting means as said third ratcheting means drives said sleeve to said operative position.

4. The apparatus as claimed in claim 1 wherein said deforming means is a brake having a drum and a pad, one of said drum and said pad being connected to said driving end of said spring and the other of said drum and pad being connected to said axle, said apparatus including control means for whichever of said drum and pad is connected to said axle, said control means, upon activation thereof, causing said pad and drum to engage one another with resulting braking thereof and resilient deformation of said spring.

5. A regenerative braking and driving apparatus for a vehicle having a wheel and an axle about which said wheel rotates, said apparatus comprising:

a spring operatively connected to said wheel and mounted to rotate about said axle, said spring having a driven end and a driving end;

deforming means which when activated causes said spring to resiliently deform with resulting braking of said wheel and which, when deactivated, allows said spring to return to an undeformed state, said spring, when so returning, driving said wheel forward;

first ratcheting means operatively interconnecting said driven end of said spring and said wheel and operable to ensure that said driven end of said spring rotates in the same direction as said wheel;

second ratcheting means operatively interconnecting said driven end of said spring and said axle and operable to ensure that said driven end of said spring is immovable relative to said axle as said spring returns to an undeformed state;

said deforming means being mounted to rotate about said axle;

third ratcheting means operatively interconnecting said driving end of said spring and said deforming means and operable to ensure that said deforming means rotates no faster than said wheel as said spring returns to an undeformed state;

a sleeve mounted to rotate about said axle, said sleeve adapted to rotate between operative and inoperative positions;

second resilient means for urging said sleeve to said inoperative position, said sleeve being operatively connected to said third ratcheting means and being caused by said deforming means, upon rotation in one direction, to rotate to said operative position, said sleeve further being connected to said first ratcheting means and causing said first ratcheting means to disengage as said sleeve rotates to said operative position, said second ratcheting means engaging upon disengagement of said first ratcheting means.

6. The apparatus as claimed in claim 5 further including means for causing said second ratcheting means to be engaged when said first ratcheting means is disengaged.

7. The apparatus as claimed in claim 5 further including means for causing disengagement of said first ratcheting means and engagement of said second ratcheting means as said third ratcheting means drives said sleeve to said operative position.

8. The apparatus as claimed in claim 5 wherein said deforming means is a brake having a drum and a pad, one of said drum and said pad being connected to said driving end of said spring and the other of said drum and pad being connected to said axle, said apparatus including control means for whichever of said drum and pad is connected to said axle, said control means, upon activation thereof, causing said pad and drum to engage one another with resulting braking thereof and resilient deformation of said spring.

9. A regenerative braking and driving apparatus for a vehicle having a wheel and an axle about which said wheel rotates, said apparatus comprising:

a spring mounted to rotate about said axle and having a driven end and a driving end;

said driven end of said spring being operatively connected to said wheel;

a brake having a drum and a pad, one of said drum and said pad being connected to said driving end of said spring and the other of said drum and pad being connected to said axle;

and control means for whichever of said drum and pad is connected to said axle, said control means, upon activation thereof, causing said pad and drum to engage one another with resulting braking thereof and resilient deformation of said spring.

10. The apparatus as claimed in claim 9 further including:

first ratcheting means operatively interconnecting said driven end of said spring and said wheel, said ratcheting means having a ratchet connected to said driven end of said spring and rotated thereby and at least one pawl operatively connected to said wheel, said ratcheting means operable to ensure that said driven end of said spring rotates in the same direction as said wheel such that resilient deformation of said spring results in braking of said wheel.

11. The apparatus as claimed in claim 10 further including:

second ratcheting means operatively interconnecting said driven end of said spring and said axle, said second ratcheting means being a roller clutch and operable to ensure that said driven end of said spring is immovable relative to said axle as said spring returns to an undeformed state.

12. The apparatus as claimed in claim 11 further including:

a spring retainer having a hollow cylinder through which said axle extends, first ratcheting means including a ratchet connected to said hollow cylinder, said roller clutch being disposed between said hollow cylinder and said axle and operable to ensure that said driven end of said spring is immovable to said axle as said spring returns to an undeformed stated.

13. The apparatus as claimed in claim 12 further including:

a sleeve mounted to rotate about said axle and being adapted to rotate between operative and inoperative positions;

and second resilient means for urging said sleeve to said inoperative position;

third ratcheting means having a pawl and a ratchet, said pawl being connected to said sleeve and the latter said ratchet being connected to said drum, said sleeve being caused by said spring, upon rotation in one direction, to rotate to said operative position, said sleeve further being connected to said first ratcheting means and causing said first ratcheting means to disengage as said sleeve rotates to said operative position, said ratcheting means engaging upon disengagement of said first ratcheting means.

14. A regenerative braking and driving apparatus for a bicycle having a wheel and an axle about which said wheel rotates, said apparatus comprising:

a hub connected to said wheel and rotatable therewith, said axle extending through said hub and around which said hub revolves;

a spring disposed about said axle within said housing and having a driven end and a driving end;

a hollow cylinder within said hub and through which said axle extends, said spring revolving around said axle, a ratchet connected to said hollow cylinder, a first pawl connected to said housing and engaging said ratchet to define a first ratcheting means, a brake having a drum and a pad, one of said drum and said pad being connected to said driving end of said spring and the other of said drum and pad being connected to said axle, control means for whichever of said drum and pad is connected to said axle, said control means, upon activation thereof, causing said pad and drum to engage one another with resulting braking thereof and resilient deformation of said spring.

15. The apparatus as claimed in claim 14 further including: a roller clutch disposed between said hollow cylinder and said axle and limiting rotation of said hollow cylinder in one direction only about said axle, said roller clutch defining a second ratcheting means.

16. The apparatus as claimed in claim 15 further including:

a sleeve mounted within said hub and being mounted to rotate about said spring, said sleeve being adapted to rotate between operative and inoperative positions;

a second spring adapted to urge said sleeve to said inoperative position;

third ratcheting means having a third pawl and a third ratchet, said third pawl being connected to said sleeve and said third ratchet being connected to said drum, said sleeve being caused by said second spring, upon rotation in one direction, to rotate to said operative position, said sleeve further being connected to said first ratcheting means and causing said first ratcheting means to disengage as said sleeve rotates to said operative position, said second ratcheting means engaging upon disengagement of said first ratcheting means.

17. A regenerative braking and driving apparatus for a vehicle equipped with a wheel having a hub and an axle about which said hub rotates, said apparatus comprising:

first resilient means operatively connected to said wheel and mounted within said hub comprising a spring mounted to rotate about said axle, said spring having a driven end and a driving end;

deforming means which when activated causes said first resilient means to resiliently deform with resulting braking of said wheel and which, when de-activated, allows said first resilient means to return to an undeformed state, said first resilient means, when so returning, driving said wheel forward;

first ratcheting means operatively interconnecting said driven end of said spring and said wheel and operable to ensure that said driven end rotates in the same direction as said wheel;

second ratcheting means operatively interconnecting said driven end of said spring and said axle and operable to ensure that said driven end of said spring is immovable relative to said axle as said spring returns to an undeformed state;

means for causing said second ratcheting means to be engaged when said first ratcheting means is disengaged.

18. A regenerative braking and driving apparatus for a vehicle having a wheel and an axle about which said wheel rotates, said apparatus comprising:

a spring operatively connected to said wheel and mounted to rotate about said axle, said spring having a driven end and a driving end;

deforming means which when activated causes said spring to resiliently deform with resulting braking of said wheel and which, when deactivated, allows said spring to return to an undeformed state, said spring, when so returning, driving said wheel forward;

first ratcheting means operatively interconnecting said driven end and said wheel and operable to ensure that said driven end rotates in the same direction as said wheel;

second ratcheting means operatively interconnecting said driven end and said axle and operable to ensure that said driven end is immovable relative to said axle as said spring returns to an undeformed state;

means for causing said second ratcheting means to be engaged when said first ratcheting means is disengaged.

19. The apparatus as claimed in claim 18, further including means for causing said second ratcheting means to be engaged when said first ratcheting means is disengaged.

20. The apparatus as claimed in claim 18, wherein said deforming means is mounted to rotate about said axis, said apparatus further including third ratcheting means operatively interconnecting said driving end and said deforming means and operable to ensure that said deforming means rotates no faster than said wheel as said spring returns to an undeformed state.

21. The apparatus as claimed in claim 20 further including means for causing disengagement of said first ratcheting means and engagement of said second ratcheting means as said third ratcheting means drives said sleeve to said operative position.

22. The apparatus as claimed in claim 20 further including:

a sleeve mounted to rotate about said axle, said sleeve adapted to rotate between operative and inoperative positions;

second resilient means for urging said sleeve to said inoperative position, said sleeve being operatively connected to said third ratcheting means and being caused by said deforming means, upon rotation in one direction, to rotate to said operative position, said sleeve further being connected to said first ratcheting means and causing said first ratcheting means to disengage as said sleeve rotates to said operative position, said second ratcheting means engaging upon disengagement of said first ratcheting means.

23. The apparatus as claimed in claim 22 wherein said deforming means is a brake having a drum and a pad, one of said drum and said pad being connected to said driving end of said spring and the other of said drum and pad being connected to said axle, said apparatus including control means for whichever of said drum and pad is connected to said axle, said control means, upon activation thereof, causing said pad and drum to engage one another with resulting braking thereof and resilient deformation of said spring.

* * * * *